United States Patent Office 3,100,434
Patented Aug. 13, 1963

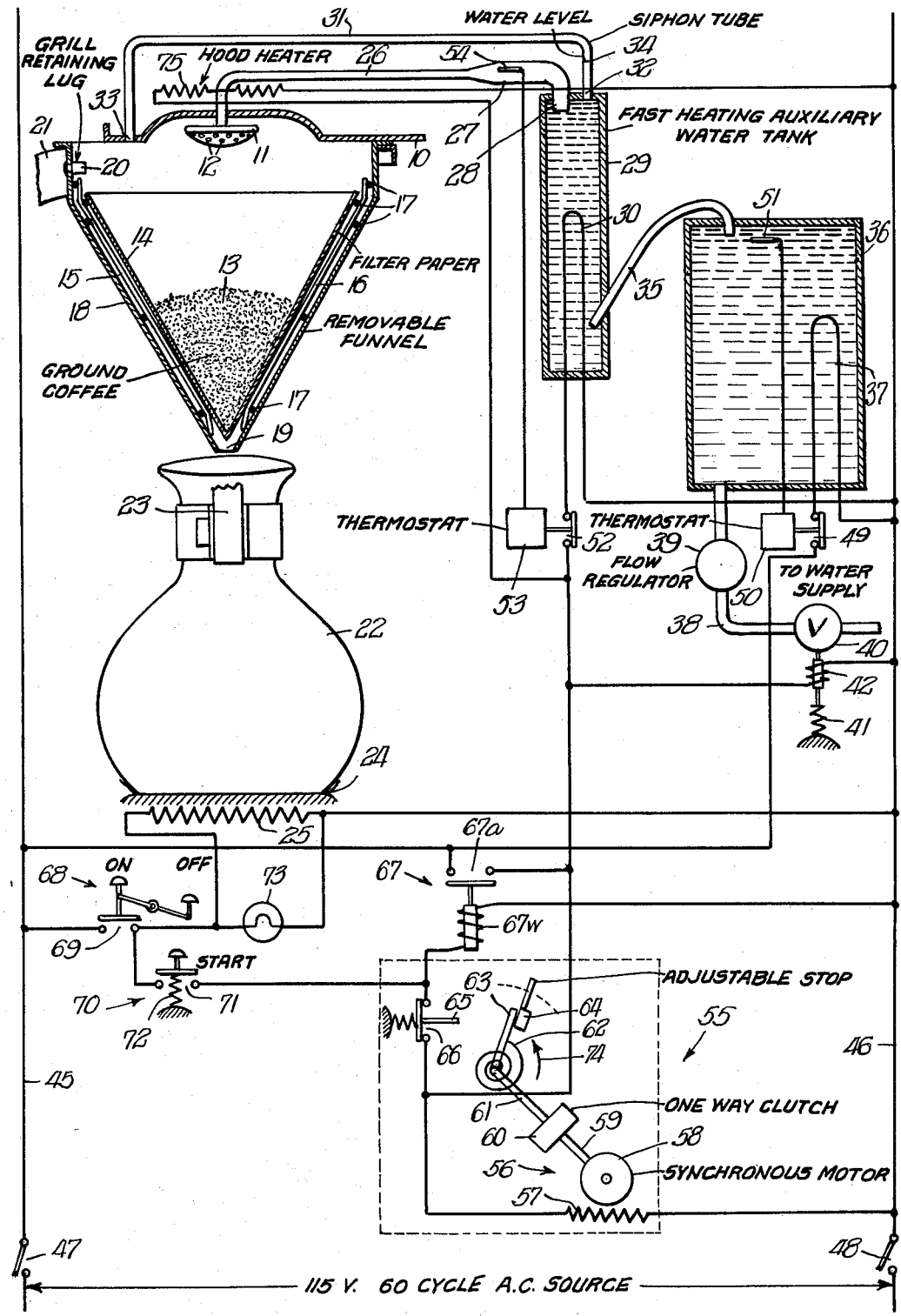

3,100,434
COFFEE MAKING MACHINE
George R. Bunn, 927 E. Adams St., Springfield, Ill.
Filed Jan. 8, 1960, Ser. No. 1,200
9 Claims. (Cl. 99—282)

This invention relates, generally, to coffee making machines, and it has particular relation to automatic coffee making machines. It constitutes an improvement over the invention disclosed in my copending application Serial No. 839,047, filed September 8, 1959, now Patent Number 3,034,417, issued May 15, 1962, of which this application is a continuation-in-part, and the disclosure thereof is incorporated herein by reference.

Among the objects of this invention are: To reduce to a minimum the likelihood of the heated water system of the coffee maker having a deposit of lime on its inner surface, particularly where the apparatus is used in locations having relatively hard water; to maintain a relatively large body of water for coffee making purposes at a relatively low temperature above normal room temperature, such as about 120° F., and to quickly raise the temperature of a relatively small portion of this heated water to a relatively high temperature, such as about 204° F., for use in the liquid coffee making cycle during a relatively short interval, such as two to three minutes; to heat the water to the relatively low temperature in a main tank having a relatively large volume and connected to a source of water under pressure and to heat the water to the relatively high temperature in an auxiliary tank having a relatively small volume and a fluid tight connection to the main tank; to regulate the flow of water during the liquid coffee making cycle at a predetermined rate; to automatically stop the flow of water and discontinue the application of heat to the relatively small portion of water at the end of a predetermined interval; to employ an automatically resettable motor driven time switch for effecting the aforesaid automatic control functions; and to positively hold the conical wire grill on which the conical filter paper is supported in the funnel when the funnel is turned upside down to discharge the filter and spent coffee grounds thereon.

Other objects of this invention will, in part, be obvious and in part appear hereinafter.

This invention is disclosed in the embodiment thereof shown in the accompanying drawing and it comprises the features of construction, combination of elements and arrangement of parts that will be exemplified in the construction hereinafter set forth and the scope of the application of which will be indicated in the appended claims.

For a more complete understanding of the nature and scope of this invention reference can be had to the following detailed description, taken together with the accompanying drawing, in which the single FIGURE illustrates diagrammatically a preferred embodiment of the invention.

Referring now particularly to the drawing, it will be observed that the reference character 10 designates a portion of a hood which is described in more detail in the application above referred to. Mounted on the hood 10 is a spray head 11 which is provided with spray openings 12 that are arranged to direct hot water downwardly and distribute it substantially evenly over ground coffee 13 which is positioned on a filter 14 in the form of a cone and composed of filter paper. It will be understood that tea can be used instead of ground coffee 13 where the end product is to be hot tea. However, for illustrative purposes, reference herein will be made to the making of coffee but it will be understood that other beverages such as tea also can be made.

The conical filter paper 14 is disposable along with the ground coffee 13 when the grounds are spent. In order to facilitate removal of the conical filter paper 14 it is mounted on a resilient conical wire grill 15 which is made up of inclined spaced side wires 16 and annularly extending wires or rings 17. The wires or rings 17 are split, as described in the application above referred to, to facilitate placing of the conical wire grill 15 in a funnel 18 which is provided with a discharge opening 19 at the bottom. In order to hold the conical wire grill 15 in place when the funnel 18 is turned upside down for discharging the conical filter paper 14 and the spent coffee grounds 13, a grill retaining stud 20 is provided. It extends radially inwardly from the upper cylindrical side portion of the funnel 18 and has a screw holding it in position and also extending into a handle 21 which facilitates positioning of the funnel 18 in operative position on the hood 10 underneath the spray head 11 and also manipulating it in the manner described. Since the wires or springs 17 are split, particularly the uppermost one, and since the side wires 16 are spaced apart, it is possible to insert the conical wire grill 15 in place with the split aligned with the grill retaining stud 20 and then to rotate the conical wire grill slightly in one direction or the other so that the grill retaining stud 20 overlies a portion of the uppermost wire or ring 17.

It will be understood that the hot water is sprayed from the head 11 over the ground coffee 13 and that liquid coffee filters through the conical filter paper 14 and flows downwardly through the discharge opening 19 into a beaker 22 which usually is formed of glass having a high heat resisting character. However, it will be understood that other receptacles can be employed instead of the beaker 22 as shown. It is provided with a handle 23 to facilitate manipulation. The beaker 22 is stationarily mounted on a support 24 in alignment with the discharge opening 19 of the funnel 18. In order to maintain the liquid coffee in the beaker 22 at an elevated temperature an electric heating element in the form of a resistor 25 is located on the support 24 and, when energized in the manner described hereinafter, serves to supply heat to the beaker 22 and its contents.

Hot water flows to the spray head 11 through a discharge water line 26 having an enlarged section 27 which extends downwardly through the upper end at 28 into a cylindrical auxiliary water tank 29. The enlarged section 27 may extend into the upper end of the auxiliary water tank 29 about ¾". The discharge openings 12 in the spray head 11 are located about 1" below the top of the auxiliary water tank 29. The cylindrical auxiliary water tank 29 has a relatively small volume, for example about 11 cubic inches, so that only a small amount of water is contained therein. This can be quickly heated to the necessary temperature for coffee making purposes by a high wattage electric tank heater 30. For example, the tank heater 30 may have a wattage of 2,000 watts and is arranged to quickly raise the temperature of the water in the auxiliary water tank 29 to a temperature below the boiling point at atmospheric pressure, for example to 204° F.

In order to prevent dripping of water from the spray head 11 at the termination of the coffee making cycle an air vent line or siphon tube 31 is employed. The intake end 32 of the air vent line or siphon tube 31 opens into the upper end of the auxiliary water tank 29 while its exhaust end 33 extends through the hood 10 and any discharge therethrough will be received by the funnel 18. It will be observed that the air vent line or siphon tube 31 extends above the discharge water line 26. In normal operation the water level in the intake end 32 of the air vent line or siphon tube 31 will be about as indicated at 34. Except for the possibility that there might be some discharge through the air vent line or siphon tube 31, it could be terminated at a slight distance above the water level as indicated at 34 since its purpose is to provided atmospheric pressure at the upper end of the auxiliary water tank 29.

The auxiliary water tank 29 has a fluid tight connection by a conduit 35 to the upper end of a rectangular main water tank 36 which has a relatively large volume, for example about 200 cubic inches. In order to maintain the water in the main water tank 36 at a relatively low temperature but above normal room temperature a low wattage electric tank heater 37 is provided. It may have a wattage of 600 watts.

It is intended that the main water tank 36 be connected to a source of water under pressure. This source may be provided by the conventional water mains of a water distribution system or by a water tank located at an elevated position. Connection to the source is provided through a supply conduit 38 and it is preferable that the pressure of the source be of the order of from 20 to 80 pounds per square inch.

While the pressure of the source may vary, it is desirable that the flow of water to the main water tank 36 and therefrom to the auxiliary water tank 29 and thence to the spray head 11 be at a fixed rate, for example, at a rate of ⅕ gallon per minute. For this purpose a flow regulator 39 of conventional construction, as shown in U.S. Patent No. 2,500,750, issued March 14, 1950, to D. H. Halenza, is inserted in the supply conduit 38.

The control of the flow of water from the supply source through the supply conduit 38 is effected by a supply valve 40 that can be closed by gravity or by a spring 41 in conventional manner. A solenoid 42 is arranged, when energized, to open the supply valve 40 and permit the flow of water through the supply conduit 38 as regulated by the flow regulator 39.

Electrical energy for operating the various electrical devices described hereinbefore can be obtained from conductors 45 and 46 which are arranged to be connected by switches 47 and 48 to a 115 volt 60 cycle alternating current source. On closure of the switches 47 and 48 and energization of the conductors 45 and 46 accordingly, the low wattage electric tank heater 37 is energized through normally closed contacts 49 over an obvious circuit. The contacts 49 are controlled by a thermostat 50 having a probe 51 located at the upper end of the main water tank 36. The thermostat 50 can be adjusted to maintain the temperature of the water in the main water tank 36 at about 120° F. It will be understood that this temperature can be raised or lowered as may be desired and is specified for illustrative purposes only. Since the water in the main water tank 36 is held at temperature in the range of 120° F. there is little likelihood of lime to be precipitated out on the walls of the main water tank 36. On the other hand, relatively hot water is supplied through the conduit 35 to the auxiliary water tank 29 where a relatively smaller amount of heat must be applied than would be the case if water at room temperature were directly supplied to the auxiliary water tank 29. Since the auxiliary water tank 29 is relatively small and water flows through it at a relatively high rate, it is desirable that a relatively large amount of heat be applied while water is flowing through it in order to raise it to the desired temperature of about 204° F. However, it is undersirable that the high wattage electric tank heater 30 be energized except during the actual coffee making cycle in order to reduce to a minimum the likelihood that lime will deposit on the interior walls of the auxiliary water tank 29. Accordingly, the control is arranged, as set forth hereinafter, so that the high wattage electric tank heater 30 is energized only during this period. It is controlled, in part, by normally closed contacts 52 that are operated by a thermostat 53 under the control of probe 54 which is located in the enlarged section 27 of the discharge water line 26. By locating the probe 34 in this position, it is possible to obtain an accurate measure of the temperature of the water flowing to the spray head 11. The adjustment preferably is such that this temperature does not exceed 204° F. However, it will be understood that this may be varied as desired and that the temperature should be below the boiling point of water at atmospheric pressure.

Since the flow of water to the spray head 11 through the auxiliary water tank 29 and main water tank 36 is at a fixed rate as controlled by the flow regulator 39, it is possible to permit a measured flow sufficient to completely fill the beaker 22 with liquid coffee by controlling the time during which the supply valve 40 is held in the open position. For this purpose a timer, shown generally at 55, is provided. The timer 55 is of conventional construction and it includes a synchronous motor, shown generally at 56, having a field winding 57 and a rotor 58 arranged to drive a shaft 59 and through a one way clutch 60 to drive a shaft 61 through a part of a revolution. The shaft 61, on rotation, tensions a helical spring 62 and at the same time moves an arm 63 away from an adjustable stop 64. Provision is made for adjusting the position of the stop 64 to the end that the arm 63 is rotated from its initial position to its final position at a time of the order of three to four minutes, the time being variable, as desired, from a few seconds to about four minutes. The arm 63 at the end of the cycle is arranged to engage an operator 65 which is effective to open normally closed timer contacts 66.

In order to relieve the timer contacts 66 of current flow therethrough and interrupting such current flow and also to provide for deenergizing the field winding 57 of the synchronous motor 56 at the end of the timing cycle a relay, shown generally at 67, is provided. The relay 67 includes an operating winding 67w and normally open contacts 67a.

In order to place the coffee making machine in operation a control switch 68 is provided having contacts 69 which remain in either the closed or open position depending upon the last operation by the operator. The actual timing cycle and coffee making operation is initiated by the closure of a start switch 70 having normally open contacts 71 that are arranged to be held open by a spring 72.

In operation, assuming that the conduit 38 is connected to a source of water under pressure and that the auxiliary water tank 29 and the main water tank 36 are filled with water, the former being filled up to the lower end of the section 28, the operator moves the control switch 68 to close contacts 69. An obvious energizing circuit then is completed for the resistor 25 which, it will be recalled, serves to supply heat to the beaker 22 on the support 24. In addition an indicating lamp 73 is energized to show that the resistor 25 is in operation and that the system otherwise is ready to function. Also, it will be recalled that the closure of switches 47 and 48 energizes conductors 45 and 46 and that the low wattage electric tank heater 37 is operative to maintain the water in the main water tank 36 at the temperature for which the thermostat 50 is set.

Next the operator momentarily depresses the start switch 70. Since the contacts 69 of the control switch 68 are closed an obvious energizing circuit through the normally closed timer contacts 66 is completed for energizing the field winding 57 of the synchronous motor 56 and it begins to operate to drive the arm 63 and wind up the helical spring 62 in a counterclockwise direction as indicated by the arrow 74. In addition an obvious energizing circuit is completed for the operating winding 67w of the relay 67 and its contacts 67a are closed. The energizing circuit for the operating winding 67w is completed through the timer contacts 66 so that, when the operator releases the start switch 70 and the spring 72 opens the contacts 71, the relay 67 is maintained in the energized condition with the contacts 67a closed as long as the timer contacts 66 remain closed. The closure of the contacts 67a of the relay 67 completes an obvious energizing circuit for the solenoid 42 of the supply valve 40 and it is opened. In addition an obvious energizing circuit is completed through the normally closed contacts 52 to the high wattage electric tank heater 30. Thus, as water flows from the main water tank 36 through the auxiliary water tank 29 and out of the openings 12 in the spray head 11, it is quickly heated to the desired temperature as it flows through the auxiliary water tank 29. Another result of the closure of the contacts 67a of the relay 67 is to complete an obvious energizing circuit for a hood heater 75 which is associated with the hood 10 for the purpose of preventing condensation in this vicinity for the reasons set forth in the application above referred to.

At the end of the timing cycle as determined by the position of the adjustable stop 64, the arm 63 engages the operator 65 and opens the timer contacts 66. The previous holding circuit for the winding 67 is opened and contacts 67a are opened. Since the field winding 57 of the synchronous motor 56 has been maintained energized through the contacts 67a, the synchronous motor 56 no longer operates through the one way clutch 60 and the spring 62 then is permitted to return the arm 63 to the starting position against the adjustable stop 64. The timer contacts 66 are reclosed. A further result of the opening of contacts 67a is to deenergize the high wattage electric tank heater 30 and the hood heater 75.

After cessation of flow of water through the supply conduit 38, the water at the top of the auxiliary water heater 29 is siphoned out to the extent indicated as permitted by the air vent line or siphon tube 31 and there is no drip from the spray head 11. The liquid coffee in the beaker 22 is maintained at an elevated temperature by the resistor heater 25 as long as the control switch 68 remains in the closed or "on" position.

It will be understood that various sizes, dimensions, operating characteristics, etc., specified herein have been set forth for illustrative purposes only and that they can be varied as circumstances may dictate in practicing this invention. Since certain further changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. A coffee making machine comprising, in combination, a main water tank, a supply valve, means connecting said main water tank through said supply valve to a source of water under pressure, means for continuously heating water in said main tank to maintain it at a relatively low temperature above normal room temperature, an auxiliary water tank connected in fluid tight relation to said main water tank, means for selectively heating water in said auxiliary tank to a relatively high temperature below 212° F., ground coffee receiving means, means placing said ground coffee receiving means in communication with said auxiliary tank whereby hot water therefrom flows through ground coffee in said receiving means, means for receiving liquid coffee from said ground coffee receiving means, and means for simultaneously opening said supply valve to cause water to flow through said main and auxiliary tanks and for energizing said heating means in said auxiliary tank whereby water at a relatively high temperature below 212° F. flows through said ground coffee and hot liquid coffee flows into said liquid coffee receiving means.

2. The invention as set forth in claim 1 wherein the volume of the main water tank is several times the volume of the auxiliary water tank.

3. The invention as set forth in claim 2 wherein means are provided for regulating the flow of water to the main water tank at a predetermined rate, and means are provided for closing the supply valve after it has been opened for a predetermined interval and for deenergizing the heating means in the auxiliary tank.

4. A coffee making machine comprising, in combination, a main water tank, a supply valve, means connecting said main water tank through said supply valve to a source of water under pressure, means for heating water in said main tank, an auxiliary water tank connected in fluid tight relation to said main water tank, means for heating water in said auxiliary tank, a discharge head mounted in spaced relation to said auxiliary water tank for causing hot water supplied thereto to discharge over a substantial area, siphon means interconnecting the upper end of said auxiliary water tank and said discharge head including a discharge water line providing a connection between said upper end of said auxiliary water tank and said discharge head and an air vent line extending above said discharge water line, means underneath said discharge head for receiving ground coffee to be covered by hot water from said discharge head, a beaker below said coffee receiving means for receiving coffee thereof, and means for opening said supply valve to cause hot water to flow through said main and auxiliary water tanks and hot water to cover said ground coffee and liquid coffee to flow into said beaker.

5. A coffee making machine comprising, in combination, a main water tank, a supply valve, means connecting said main water tank through said supply valve to a source of water under pressure, means for heating water in said main tank, an auxiliary water tank connected in fluid tight relation to said main water tank, means for heating water in said auxiliary tank, a discharge head mounted in spaced relation to said auxiliary water tank for causing hot water supplied thereto to discharge over a substantial area, siphon means interconnecting the upper end of said auxiliary water tank and said dscharge head including a discharge water line providing a connection between said upper end of said auxiliary water tank and said discharge head and an air vent line extending above said discharge water line, means underneath said discharge head for receiving ground coffee to be covered by hot water from said discharge head, a beaker below said coffee receiving means for receiving coffee therefrom, means for opening said supply valve to cause water to flow through said main and auxiliary water tanks and hot water to cover said ground coffee and liquid coffee to flow into said beaker, means for regulating the flow of water to said main water tank at a predetermined rate, and means for closing said supply valve after it has been opened for a predetermined interval.

6. A coffee making machine comprising, in combination, a main water tank, a supply valve, means connecting said main water tank through said supply valve to a source of water under pressure, means for continuously heating water in said main tank to maintain it at a relatively low temperature above normal room temperature, an auxiliary water tank connected in fluid tight relation to said main water tank, means for selectively heating water in said auxiliary tank to a relatively high temperature below 212° F., a discharge head mounted in spaced relation to said auxiliary water tank for causing hot water supplied thereto to discharge over a substantial area, siphon means interconnecting the upper end of said auxiliary water tank and said discharge head including a discharge water line providing a connection between said upper end of said auxiliary water tank and said discharge head and an air vent line extending above said discharge water line, means underneath said discharge head for receiving ground coffee to be covered by hot water from said discharge head, a beaker below said coffee receiving means for receiving coffee therefrom, and means for opening said supply valve to cause water to flow through said main and auxiliary tanks and for energizing said heating means in said auxiliary tank whereby water at a temperature slightly below 212° F. flows through said ground coffee and hot liquid coffee flows into said liquid coffee receiving means.

7. The invention as set forth in claim 6 wherein the auxiliary water tank extends above the level of the openings in the discharge head, and the volume of the main water tank is several times the volume of the auxiliary water tank.

8. The invention as set forth in claim 7 wherein means are provided for regulating the flow of water from the auxiliary water tank to the discharge head at a predetermined rate, and means are provided for closing the supply valve after it has been opened for a predetermined interval and for deenergizing the heating means in the auxiliary tank.

9. A coffee making machine comprising, in combination, a water tank, a supply valve, means connecting said water tank through said supply valve to a source of water under pressure, means for heating water in said tank, a discharge head mounted in spaced relation to said water tank for causing hot water supplied thereto to be discharged therefrom, siphon means interconnecting said water tank and said discharge head including a discharge water line providing a connection between said water tank and said discharge head and an air vent line extending above said discharge water line through which water does not normally flow and in which the water level under normal operating conditions is the same as the highest level of the water in said discharge water line, means associated with said discharge head for receiving ground coffee to have applied thereto hot water from said discharge head, a beaker associated with said coffee receiving means for receiving coffee extract therefrom, a solenoid for operating said supply valve, manually operable switch means for connecting said solenoid for energization to a source of electric current, a relay having an operating winding connected to be energized from said current source on closure of said manually operable switch means and normally open contacts connected in shunt circuit relation with said manually operable switch means for maintaining completed the energizing circuits for said solenoid and said operating winding on opening of said manually operable switch means, normally closed timer contact means connected in series circuit relation with said operating winding, a timing motor connected for energization to said current source on closure of said manually operable switch means, said timing motor being maintained energized through said contacts of said relay as long as its operating winding remains energized and being deenergized on opening of said contacts of said relay in response to deenergization of its operating winding, a driven member, means operatively interconnecting said timing motor and said driven member, means operatively interconnecting said driven member and said timer contact means to open the same a predetermined time after energization of said timing motor, and means biasing said driven member to an initial position whereby on deenergization of said timing motor said driven member is returned to said initial position by said biasing means.

References Cited in the file of this patent

UNITED STATES PATENTS

| | | |
|---|---|---|
| 171,601 | Clark | Dec. 28, 1875 |
| 857,676 | Rogers | June 25, 1907 |
| 1,508,809 | White | Sept. 16, 1924 |
| 2,568,840 | Zees | Sept. 25, 1951 |
| 2,660,947 | Forschner | Dec. 1, 1953 |
| 2,839,988 | Tritt | June 24, 1958 |
| 2,969,451 | Logan | Jan. 24, 1961 |
| 3,034,417 | Bunn | May 15, 1962 |

FOREIGN PATENTS

| | | |
|---|---|---|
| 637,382 | France | Jan. 28, 1928 |
| 505,764 | Belgium | Sept. 29, 1951 |